United States Patent [19]
Crawford et al.

[11] Patent Number: 4,616,261
[45] Date of Patent: Oct. 7, 1986

[54] METHOD AND APPARATUS FOR GENERATING SUBLIMINAL VISUAL MESSAGES

[75] Inventors: James R. Crawford, Lainsburg; Jerald L. Winegeart, Niles; Michael H. Erb, DeWitt, all of Mich.

[73] Assignee: Stimutech, Inc., Ann Arbor, Mich.

[21] Appl. No.: 542,467

[22] Filed: Oct. 17, 1983

Related U.S. Application Data

[63] Continuation-in-part of Ser. No. 491,612, May 4, 1983, abandoned.

[51] Int. Cl.⁴ .................... H04N 5/262; H04N 13/02
[52] U.S. Cl. .................................. 358/181; 358/92; 358/142; 358/183
[58] Field of Search ............. 358/181, 183, 92, 142, 358/236

[56] References Cited
U.S. PATENT DOCUMENTS 4,006,291  2/1977  Imsand ............................. 358/92
4,151,557  4/1979  Iida ................................. 358/181
4,424,591  1/1984  Boardman ....................... 358/181

Primary Examiner—Tommy P. Chin
Attorney, Agent, or Firm—Krass & Young

[57] ABSTRACT

A system for generating a subliminal message during the display of a normal television program on a television receiver utilizes a personal computer to generate an RF carrier modulated with video signals encoding the subliminal message. The computer runs under the control of an application program which stores the subliminal message and also controls the computer to cause it to generate timing signals that are provided to a single pole double-throw switch. The source of the normal television program and the video output of the computer are connected to the two switch inputs and the switch output is connected to the television receiver antenna system. The timing signals cause the switch to normally display the conventional television program and to periodically switch to the computer output to generate the subliminal message. The video output of the computer includes horizontal and vertical synchronizing signals which are of substantially the same frequency as the synchronizing signals incorporated within the normal program source but of an arbitrary phase.

22 Claims, 3 Drawing Figures

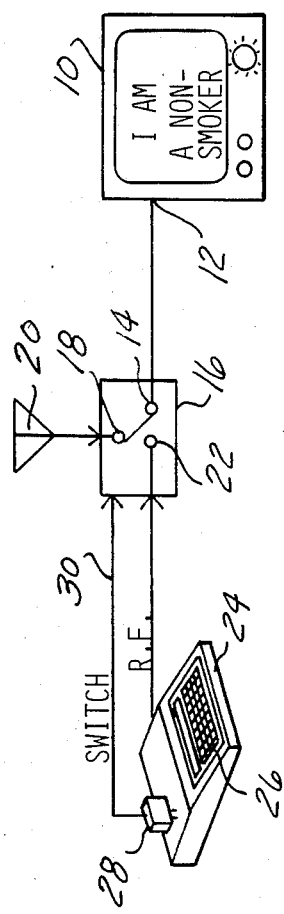
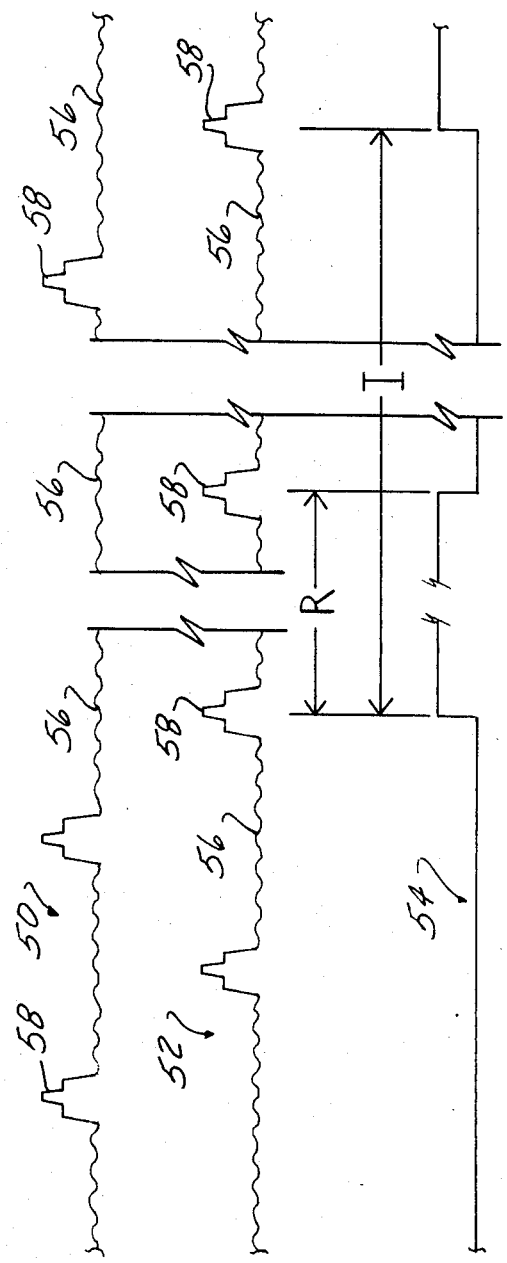

METHOD AND APPARATUS FOR GENERATING SUBLIMINAL VISUAL MESSAGES

This application is a continuation-in-part of application Ser. No. 491,612, filed May 4, 1983 abnd.

FIELD OF THE INVENTION

This invention relates to a method and apparatus for causing the generation of a subliminal message superimposed on a supraliminal program being displayed on a television receiver.

BACKGROUND OF THE INVENTION

A substantial body of scientific evidence exists to support the proposition that a human subject may be influenced by visual messages generated at intensity and duration levels sufficiently low that they are not consciously perceived by the subject. U.S. Pat. Nos. 3,060,795 and 3,278,676 disclose a variety of systems adapted to display a supraliminally perceptible visual image having a subliminally perceptible message superimposed thereon. These patents disclose motion picture and television systems for displaying conventional programs along with secondary visual signals that have such low levels of intensity and/or duration that they are not consciously perceptible by a human observer but are capable of impressing themselves upon the subconscious mind of the observer to influence behavior.

The systems disclosed in these patents as well as the subsequent subliminal visual message system disclosed in U.S. Pat. No. 4,006,291 all involve arrangements wherein both the source of the supraliminal program signal and subliminal message signal are under control of the system's operator. In the motion picture version disclosed in U.S. Pat. No. 3,060,795, a pair of separate motion picture projectors employ mechanism connecting them so that they operate in synchronism to generate the supraliminal program signal and the superimposed subliminal mesasge. In the television versions disclosed in the above-noted patents, pairs of television cameras are used to generate the two signals and their outputs are synchronized to provide a combined signal suitable for use directly by a television receiver or for radio transmission to remote receivers.

The highly specialized apparatus required for these prior art systems has severely limited their application. If a subliminal mesasge system could be formed with readily available equipment, such as a home television receiver, which could use conventionally broadcast programs as the supraliminal program source, it would have great utility for impressing the observer with subliminal message that might educate the observer or direct him or her toward desirable action.

SUMMARY OF THE INVENTION

The present invention is accordingly directed toward a method and apparatus for superimposing subliminally perceptible messages on a conventional television receiver which is displaying normal program sources derived from broadcast or cable TV, a video record or the like. The system is intended to be attached to an entertainment television receiver without the necessity of any mechanical or electrical modification of the television set. It utilizes as its primary components apparatus often available in the home for other purposes.

Broadly, the present invention provides means for generating a video signal encoded with a subliminal message and horizontal and vertical synchronizing signals which are of substantially the same frequency as those forming part of the supraliminal signal source connected to the receiver but have an artibrary phase with respect to the supraliminal synchronizing signal. The present invention further contemplates a single pole double-throw RF switching device having inputs from the supraliminal program source and the subliminal message source and having an output to the television receiver. The switch is controlled so that it normally is connected to the supraliminal program source causing the receiver to display that program under control of the horizontal and vertical synchronizing signals forming part of the program composite signal. At regular intervals the switch is controlled to disconnect the program source from the television receiver and supply the subliminal signal with its independent synchronizing signals. The subliminal signal may be applied to the receiver for as little as 500 microseconds, but, in the preferred embodiment, it is generated for the time required to display one full raster field on the television screen, normally about 1/60th of a second. During this time, the synchronization generators of the television receiver are under the control of the synchronizing signals forming part of the subliminal program source and will switch the phase of the generated raster scan to match these new synchronizing signals. The subliminal message will, therefore, be generated on the TV screen during one raster scan or field.

In order to assure synchronization of the vertical and horizontal synch signals as well as synchronization of color signals, AFG and AGC, display of the subliminal message is delayed from one to 24 picture fields following switching off from the supraliminal program source. During this delay, a completely black or blue field is displayed so that the synchronization is not perceived by the viewer. The delay is not visually objectionable and does not negatively affect the device as a subliminal generator.

In the preferred embodiment of the present invention a subliminal video signal is generated by a general purpose computer, preferably of the "home" or "personal" type, running an application program which causes repeated generation of the subliminal video message, once for each raster field, at the video output of the computer. The application program also causes the generation of two-level switching signals for the antenna switch and also synchronizes display of the subliminal program material with vertical retrace signals so that the program material or "message" is displayed at a predetermined position in each picture field. In one embodiment of the invention, which will subsequently be disclosed in detail, the application program for the computer takes the form of a module, including a read-only memory (ROM), adapted to be connected to the computer. The module may also contain a bistable switching device (flip-flop) for generating the timing signals. Alternatively, the application program may make use of a flip-flop and an output port available on the computer to generate the timing signals. The application program stored in the ROM causes the computer to generate logic level signals which are applied to the flip-flop and cause it to provide a higher power output switching signal. This switching signal is coupled to the RF switch, along with the subliminal RF signal, and controls its operation.

In an alternative embodiment of the invention, the subliminal message is not encoded in the application program but the application program allows the computer operator to input to the computer the particular subliminal message that is to be displayed.

BRIEF DESCRIPTION OF THE DRAWINGS

Other objects, applications and advantages of the invention will be made apparent by the following detailed description of a preferred embodiment of the invention. The description makes reference to the accompanying drawings in which:

FIG. 1 is a schematic diagram illustrating the interconnection of a television receiver, a computer incorporating an application program module formed in accordance with the present invention, and an antenna switch for the television receiver;

FIG. 3 are illustrations of television program and computer video output signals and timing signals illustrating their interrelationship to one another.

DESCRIPTION OF THE PREFERRED EMBODIMENT

Figure 2:
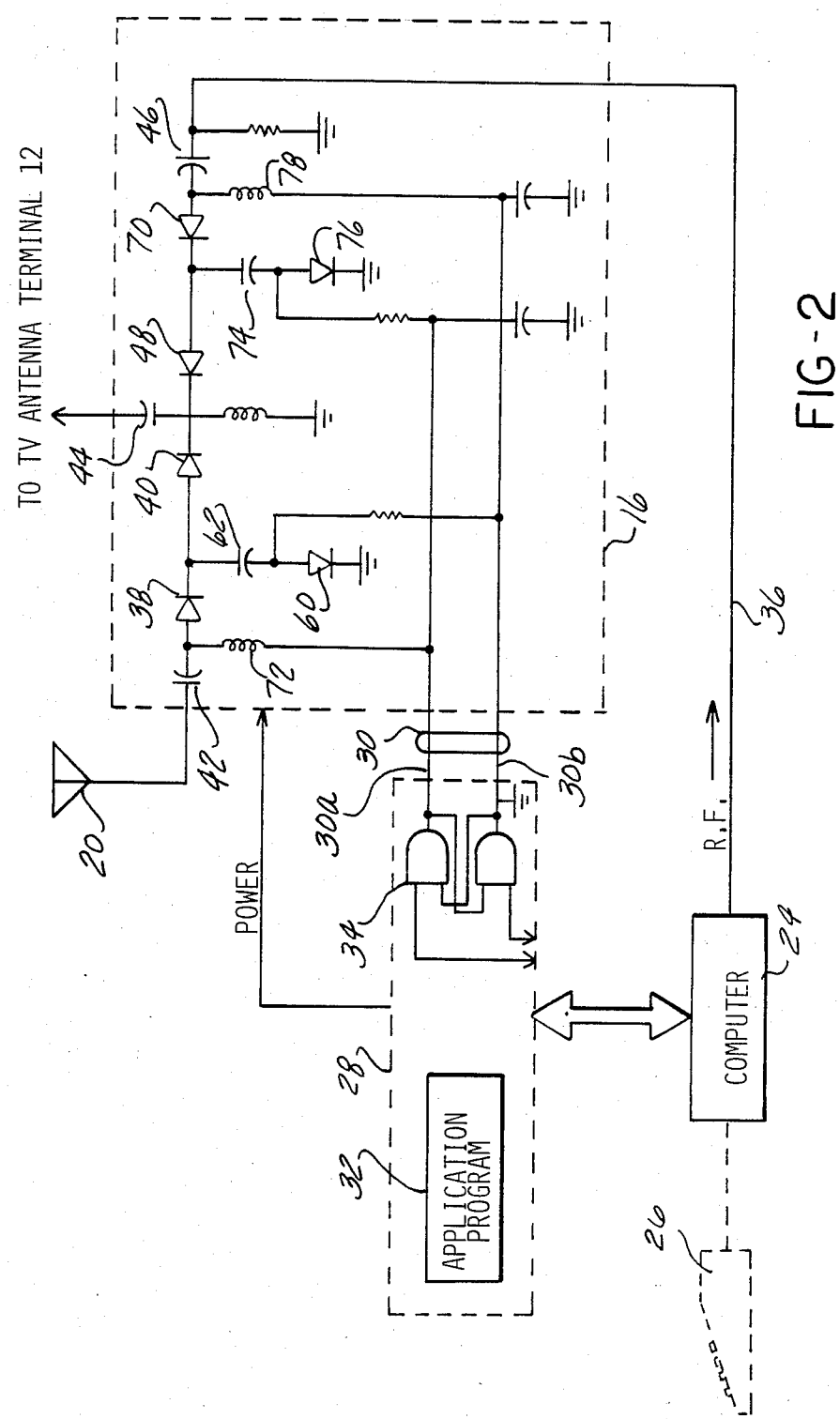
FIG. 2 is a schematic diagram illustrating the antenna switch and the read-only memory module construction in greater detail.

Referring to the drawings, the present invention preferably employs a conventional entertainment television receiver 10. The receiver has an antenna input line 12 connected to the common terminal 14 of an electronic, single pole, double-throw switch 16. One of the input terminals 18 of the switch 16 is connected to a conventional television signal source 20, such as an antenna, cable TV outlet, video cassette player, video disc player or the like. The signal source 20 provides a conventional television signal in the form of radio frequency carrier modulated with horizontal and vertical synchronizing signals and appropriate video signals. They may constitute black and white signals or color signals.

The second input terminal 22 of the switch 16 is connected to the video output of a subliminal signal source which preferably takes the form of a "personal" or "home" general purpose computer 24 of the conventional type embodying a microprocessor and a keyboard 26, or alternatively, a video game or the like.

The computer incorporates a plug-in program module 28 formed in accordance with the present invention. The program module has an outpute cable 30 which connects to the antenna switch 16 and controls the position of the switch in a manner which will be subsequently described. In alternative embodiments of the invention the program could be provided in other forms such as a disc or cassette and alternative methods could be used to provide the signals to the switch 16.

The RF output of the computer 24 which is provided to the switch 16 constitutes a radio frequency signal modulated with conventional horizontal and vertical synchronizing signals and a video signal determined by the nature of the application program module 28. In the preferred embodiment of the invention the radio frequency of the video signal provided by the computer 24 must be the same as the freeuency of the channel to which the television receiver 10 is tuned. This may be achieved in a number of ways. In the case of cable TV in which a converter is provided which tunes any of a number of incoming channels to a common channel of the television receiver, the frequency of the video source can be matched to that channel frequency. Alternatively, with a conventional broadcast reception television receiver the radio frequency of the video output of the computer may be chosen to match one of the popular channels to which the television receiver is tuned.

In an alternative embodiment of the invention wherein the television receiver is of the type equipped with inputs directly to its decoded video circuits, the output of the switch could be provided directly to these video inputs, by bypassing the antenna circuits. In this case, means would have to be provided for demodulating the broadcast signal source.

In still another alternative embodiment of the invention a channel converter could be provided to match the frequency of the subliminal source to that of the television program source 20.

The application program module 28 preferably takes the form of a read-only memory module that plugs into the personl computer 24. The program will preferably incorporate a subliminal message that is to be displayed on the television receiver, such as the message "I am a non-smoker" which is illustrated in FIG. 1 as a typical message. Other messages could be directed toward altering the viewer's dietary habits, such as "I see myself as thin"; the viewers personal habits such as "I am neat", or the like.

Alernatively, the program stored in the module 28 may allow the operator to generate any desired subliminal message, using the keyboard 26 as an input source.

In either event, the video output of the computer, applied to terminal 22 of the switch 16, constitutes an RF signal modulated with conventional horizontal and vertical synchronizing signals and a video message that is the same from frame to frame; i.e., the message such as "I am a non-smoker" is generated during one full raster scan (picture field) and is repeated at the raster scan rate. The scan lines encoding the actual message may occur at a delay relative to the vertical retrace signal forming part of the composite video output of the personal computer or may commence concurrent with such signal. As will be subsequently described, the video synchronizing signals of the computer are allowed sufficient time in which to gain control over the horizontal and vertical oscillators of the television receiver 10 when the receiver is switched to that video output. In some types of receivers, it may be necessary to utilize a longer stability period, up to 150 milliseconds, before the message is generated. During the delay period, a blank screen is displayed on the television receiver. This longer delay period may be simply accomplished using instructions in the application program and has the advantage of assuring that synchronization of AFG, AGC, and color is properly achieved. A 150 millisecond delay period is not believed to reduce the affect of the subliminal message on a human subject and does not pose an objectionable distraction from the supraliminal programming.

The switching signal on line 30 is such as to normally cause the television receiver to be connected to the conventional television pogram source 20. At regular intervals the input 30 causes the switch 16 to throw to connect the television receiver to the video output of the computer for a minimum of 500 microseconds, but preferably, for at least one field of the video ouptut; i.e., approximately 1/60th of a second. When a delay period is used, the television receiver will remain connected to the computer for up to 150 milliseconds, depending on the length of the delay period.

The synchronizing signals for the computer video output are generated independently of the synchronizing signals that form part of the signal from the program source 20. They will be of substantially the same frequency since they are generated using a quartz clock source of 3.759545 megahertz as a base, the same base as used with the NTSC signal standard utilized in most of the western world. When other signal standards are used, the computer video signal source would have a related frequency. However, the phases of the video signals generated by the computer 24 and the program source 20 will be arbitrary with respect to one another.

Assuming that the horizontal and vertical scan generators within a television receiver lock on the horizontal and vertical synchronizing signals accompanying the video signal from the computer 24 within a few raster scan lines after switch 16 connects to the computer, the subliminal message encoded in the computer video signal will have the proper horizontal displacement relative to the TV receiver screen but may have an arbitrary vertical position. Since the vertical retrace operation of the television receiver will still be controlled by the previous signal from the source 20, the possibility exists that the subliminal message will be generated during vertical retrace or will be split by vertical retrace. If the subliminal message is maintained small enough the possibility of this occurrence is minimized and its occasional occurrence will not affect provision of the subliminal message to an appreciable degree. Accordingly, the source of the subliminal signal and the source of the program signal may be unsynchronized with respect to one another and the system may operate properly.

This problem can be eliminated however by providing a delay period following switching to the subliminal program source. The delay may be from 1 to 24 picture fields, i.e. up to about 150 milliseconds, during which time the picture screen is blanked out.

In the preferred embodiment, the delay lasts for 11 picture fields and is followed immediately by a single picture field containing the subliminal message. During the delay period, the television receiver 10 is given an opportunity to lock on to the horizontal and vertical synch signals from the computer 24 and the possibility of spliting the message due to a retrace signal from the source 20 is eliminated. This delay period also permits the television receiver 10 to lock onto the color, AFG and AGC signals of the computer 24; in this manner, the appearance and intensity of the colors displayed during the message are maintained, thus preserving the subliminality of the message.

The relationship of the computer 24, its application program module 28, and the antenna switching circuit 16, are illustrated in more detail in FIG. 2. The module 28 stores the application program 32 in read-only memory, and also may include a flip-flop 34 which connects to the computer and provides an output on line 30 to the switch 16. Alternatively, the computer itself may contain a flip-flop which can be used by the application program 32 to provide the output to the switch 16. In either case, the application program 32 stores alphanumeric characters representative of the subliminal message to be generated. The application program may also allow the operator to generate his own texts for subliminal programs from the computer keyboard 36 which is illustrated in phantom lines.

The program 32 causes the computer to generate a repetitive radio frequency video signal on line 36, each signal consisting of one full screen of raster scans and also includes instructions to cause a delay in the display of the message in order to achieve signal synchronization as previously discussed.

As will be subsequently described in connection with the description of FIG. 3, the full raster begins with a horizontal synchronizing pulse and the program 32 controls the computer 24 to cause it to provide signals to the flip-flop 34 which generate output timing signals on line 30 and synchronize their initiation with the generation of the horizontal synchronizing pulses on line 36. The cable 30 consists of two wires 30a and 30b. The flip-flop 34 provides a high signal on one of the lines at any given instant and a low signal on the other. When the line 30a is high, a signal from a program source or antenna 20 is switched to the TV antenna terminal 12. When the output on line 30b is high, the video signal in the computer on line 36 is switched to the antenna terminal 12. Normally, the line 30a is high and line 30b is low, connecting the regular program source 20 to the TV receiver.

Once each predetermined interval, such as once each 60 seconds, the computer provides signals to the flip-flop 34 causing the output on line 30a to go low and the output on line 30b to go high, switching the subliminal signal source into the computer. This occurs at the beginning of the first horizontal scan of the full raster scan and lasts from about one-sixteenth of a second, if no synchronizing delay is used, up to about 150 milliseconds when the display is synchronized. The interval between raster scans of the subliminal message must be sufficiently long to prevent supraliminal observation of the generated display.

Considering the detailed construction of the switch 16, the program source 20 is coupled to the antenna terminal 12 by a pair of isolating capacitors 42 and 44, and a pair of series connected diodes 38 and 40. Similarly, the video input 36 of the computer is coupled to antenna terminal 12 through an isolating diode 46 and a pair of series connected diodes 48 and 70. The line 30a connects to the midpoint between the capacitor 42 and the diode 38 through a choke coil 72 and connects to the midpoint between the diodes 48 and 70 through the midpoint of a series connected capacitor 74 and a diode 76. Similarly, line 30b connects to the midpoint between the capacitor 46 and the diode 70 through a coil 78 and connects to the midpoint between the diodes 38 and 40 through the midpoint between a series combination of a grounded diode 60 and a capacitor 62.

When line 30a is high and the line 30b is low, the diodes 38 and 40 are forward biased to provide a low resistance path to the antenna terminal from the program source 30, and a low impedance path to ground for the video signal 36. At the same time, diodes 48 and 70 are back biased to present a high impendance to the RF signal 36. This relationship is reversed when the line 30b goes high and line 30a goes low, shorting out the program source and switching the video source to the antenna terminal.

FIG. 3 illustrates the relationship between the composite television signal from the program source 20 generally indicated at 50, the composite television signal from the computer and occurring on line 36, generally indicated at 52, and the switching signal on line 30, generally indicated at 54. The composite signals 50 and 52 are illustrated in demodulated form. They include video signal sections 56, which may include chrominence and luminence signals if the transmission is in color, interspersed with periodic horizontal synch signals 58. The phase of the horizontal synch signals forming part of the composite signal 52 is illustrated as being out of phase with the synch signals forming part of the signal 50, which will normally be the case.

The switching signals 54 are generated by the computer in timed relationship with the horizontal synch signals forming part of the subliminal signal 52. The output on line 30 is normally low but goes high for normally more than one full raster scan (field), consisting of a plurality of segments between the horizontal synchronizing pulse. The duration of a high pulse is designated in FIG. 3 as R, will constitute 1/60th of a second plus the delay period required to achieve synchronization. The interval I between successive pulses that cause the generation of the subliminal message should be larger than several frames to avoid integration of successive subliminal frames by the eye of the observer, and may be as long as a minute or two apart, without diminishing the effectiveness of the system.

We claim:

1. The method of generating subliminal visual messages on a television receiver, having horizontal and vertical scan generators, during the display of a supraliminal television program derived from a program source comprising:

generating a signal representative of one of said subliminal messages with independent horizontal and vertical synchronizing signals independent of synchronizing signals of the program source and switching the television receiver from the program source to said subliminal signal for intervals sufficiently short to prevent the presentation of said subliminal signal as a supraliminal display, whereby the horizontal and vertical scan generators of the television receiver are controlled by said synchronizing signals of the program source at such time as the receiver is connected to the program source and by said independent horizontal and vertical synchronizing signals of said signal representative of one of said subliminal messages at such time as the television receiver is switched to the last said signal to produce display of a program containing one of said subliminal messages.

2. The method of claim 1 in which said signal representative of one of said subliminal messages constitutes a radio frequency signal modulated with one of said subliminal messages and with said independent horizontal and vertical synchronizing signals and wherein the television receiver includes an antenna circuit which is switched between said modulated radio frequency signal and the program source.

3. Apparatus for generating a subliminal message on a conventional supraliminal television display, the display having horizontal and vertical scan generators, comprising:

a source of a supraliminal television signal encoded with video signals and horizontal and vertical synchronizing signals;

a source of a subliminal television signal encoded with a subliminal video signal and independent horizontal and vertical synchronizing signals generated at the same rate as the horizontal and vertical synchronizing signals of the supraliminal signal but with independent phase;

switching means having inputs from the supraliminal signal source and the subliminal signal source and having output to a television receiver; and means for controlling the switching means to normally provide the supraliminal signal to the television receiver in order to generate a display of the supraliminal television signal and to switch the television receiver to the subliminal source for a period sufficient to generate the subliminal message and for intervals sufficiently short to prevent the subliminal signal from being supraliminally observable, whereby the horizontal and vertical scan generators of the television receiver will be controlled by either the subliminal signal source or the supraliminal signal source to produce appropriate display thereof without need of synchronizing the independent horizontal and vertical synchronizing signals from the subliminal signal to the respective signals of the supraliminal signal.

4. The apparatus of claim 3 wherein said supraliminal television signal and said subliminal television signal both constitute radio frequency signals modulated with their respective video signals and synchronizing signals and the output of said switching means is connectable to an antenna circuit of a television receiver.

5. The apparatus of claim 3 wherein said source of a subliminal television signal encoded with a subliminal video signal and horizontal and vertical synchronizing signals constitutes a general purpose computer running an application program strong signals representative of the subliminal video signal, the computer including a video display generator and having its video output connected to said switching means.

6. The apparatus of claim 5 wherein said means for controlling the switching means operates under control of said application program.

7. The apparatus of claim 6 wherein said application program is a readonly memory adapted to interconnect to said computer.

8. The apparatus of claim 7 wherein said read-only memory is a module which includes a bistable multivibrator operating under control of the general purpose computer and having its output connected to said switching means and constituting the means for controlling said switching means.

9. An apparatus for connection to a general purpose computer and a television receiver adapted to receive a program from a supraliminal signal source operative to cause the receiver to generate a subliminal message during supraliminal generation of the program from the supraliminal signal source comprising:

a single pole double-throw switch having a common terminal adapted to be connected to the television receiver and having pole terminals adapted to be connected to said supraliminal signal source and the video output of the general purpose computer;

an application program for the general purpose computer adapted to cause it to generate a subliminal signal comprising video signals representative of said subliminal message and horizontal and vertical synchronizing signals independent of horizontal and vertical synchronizing signals of the program through its video output;

and means for causing the switch to normally connect the supraliminal signal source to the television receiver and to periodically disconnect the supraliminal signal source from the television receiver and to simultaneously connect the subliminal signal to the television receiver for periods not exceeding the time required to generate a single picture field on the television receiver and at intervals sufficiently long to generate a supraliminal display of the program and a subliminal display of the subliminal message.

10. The apparatus of claim 9 wherein said means for causing the switch to normally connect the supraliminal signal source to the television receiver and to periodically disconnect the supraliminal source from the television receiver and to simultaneously connect the subliminal signal to the television receiver operates under control of the general purpose computer.

11. The apparatus of claim 10 wherein the general purpose computer includes input means and programmable memory means and the application program includes means for generation of the subliminal message which is inputted through the input means and stored in the memory means.

12. The apparatus of claim 9 wherein said application program for the general purpose computer is a module adapted to be connected to said general purpose computer and said module includes a bistable device having its output connected to the switching and operative to be controlled by the application program in timed relation to the generation of display signals by the video output of the computer.

13. A switch system operative to be connected to a television receiver, the television receiver having horizontal and vertical scan generators, a source of television programs having horizontal and vertical synchronizing signals, and a source of a subliminal message having independent horizontal and vertical synchronizing signals in order to generate a supraliminal display of a television program on the receiver with a superimposed subliminally perceptible generation of a subliminal message, comprising:

a single pole double-throw switch adapted to have its common terminal connected to the television receiver and its two pole terminals connected to the television program source and the subliminal message source;

and means for causing the switch to normally be positioned to connect the television program source to the television receiver and to intermittently disconnect the television program source from the television receiver and to connect the subliminal message source to the television receiver for periods not exceeding the time required to generate a single television frame display and at intervals sufficiently large to generate a supraliminally perceptible image of the television program and subliminally perceptible image of the subliminal message whereby said horizontal and vertical scan generators of the television receiver are controlled by either the television program source or the subliminal message source to produce appropriate display thereof without need of synchronizing said independent horizontal and vertical synchronizing signals of the subliminal message to said respective signals of the television program.

14. The switch system of claim 13 in which the television program source and the subliminal program source constitute radio frequency signals of a common frequency adapted to be tuned by the television receiver each encoded with horizontal and vertical synchronization signals of substantially common frequency and independent phase.

15. An application program adapted to be connected to and executed by a general purpose computer having a video output signal in the form of a radio frequency signal having synchronizing signals for use with a switch adapted to receive the video output signal of the computer and a television picture signal having independent synchronizing signals and to selectively connect one of the video output signal or the television picture signal to a television receiver in order to generate a supraliminal display of the television picture signal superimposed with a subliminally perceptible display of the computer generated video output signal, said program comprising:

means for causing the computer to modulate said radio frequency signal with a subliminal message signal and to cause the generation of two-level switch control signal operative to cause the switch to periodically connect the television receiver to the video output signal for periods not exceeding the time required to achieve synchronization of the television receiver to the video output signal and display a single video frame at intervals sufficiently large to cause the generation of a supraliminally perceptible display of the television picture with a superimposed subliminally perceptible display of the subliminal message whereby the synchronizing signals of the video output signal need not be in synchronization with the independent synchronizing signals of the television picture signal.

16. The application program of claim 15 wherein the application program is stored in a read-only memory and includes said subliminal message.

17. The application program of claim 16 wherein the read-only memory is adapted to be connected to an input port of the computer and further includes a cable adapted to be connected to the switching means, whereby the application program causes the computer to generate timing signals which cause the generation of a switch controlling output on the cable.

18. A method of generating a subliminal visual message using a television receiver, comprising the steps of:

displaying a supraliminal image on a screen of said television using a first set of signals, including horizontal and vertical synchronizing signals, from a convention television program source;

generating a second set of signals representing the subliminal message using a subliminal message program source, said second signals including independent horizontal and vertical synchronizing signals for synchronizing raster scanning of said screen interrupting the display of said supraliminal image on said screen;

displaying said subliminal message on said screen using said second set of signals during the interruption of the supraliminal message display for intervals sufficiently short to prevent the subliminal message from being supraliminally observable, without need of synchronizing the independent horizontal and vertical synchronizing signals of the subliminal message to respective signals of the television program source; and resuming the display of said supraliminal message on said screen after said subliminal message has been display on said screen.

19. The method of claim 18, wherein the display of said supraliminal message is interrupted for a period of time sufficient to terminate control of said television receiver by said independent horizontal and vertical synchronizing signals associated with said television program source.

20. The method of claim 19, wherein said subliminal message is displayed on said screen within a single picture field of raster scanning.

21. The method of claim 18, wherein the step of generating the second set of signals is performed using a computer provided with a set of programmed instructions.

22. The method of claim 18, wherein said resuming step is commenced within 150 milliseconds following the interrupting step.

* * * * *